P. T. Badoux
Alcohol Still.

Nº 61,651.  Patented Jan. 29, 1867.

Witnesses:
F. A. Jackson
Wm Truwn

Inventor:
P. J. Badoux
Per Munn & Co
Attorneys

United States Patent Office.

PIERRE T. BADOUX, OF NEW YORK, N. Y., ASSIGNOR TO THOMAS GANNON, OF NEW YORK CITY.

*Letters Patent No. 61,651, dated January 29, 1867.*

IMPROVEMENT IN DISTILLING AND EVAPORATING LIQUIDS.

*The Schedule referred to in these Letters Patent and making part of the same.*

TO ALL WHOM IT MAY CONCERN:

Be it known that I, PIERRE T. BADOUX, of 26 Old Slip, in the city, county, and State of New York, have invented a new and improved Apparatus for Evaporating and Distilling Liquids; and I do hereby declare that the following is a full, clear, and exact description thereof, which will enable others skilled in the art to make and use the same, reference being had to the accompanying drawings, forming a part of this specification, in which—

Figure 2:
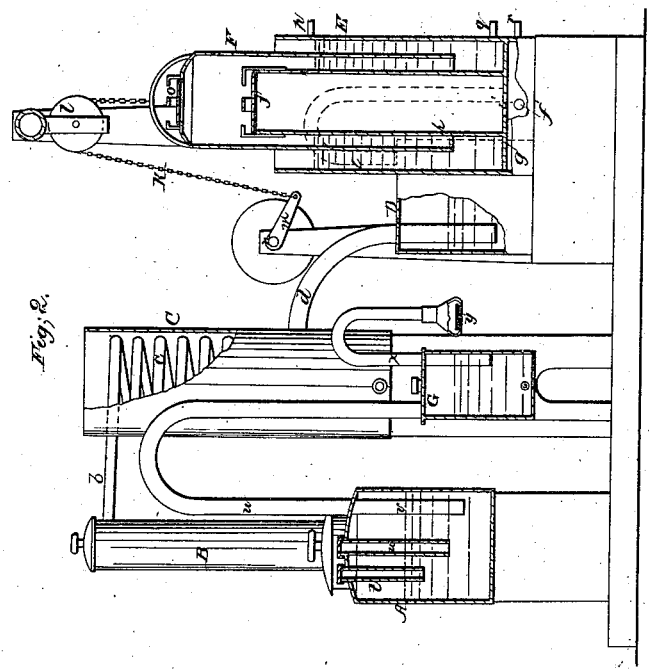
Figure 1:
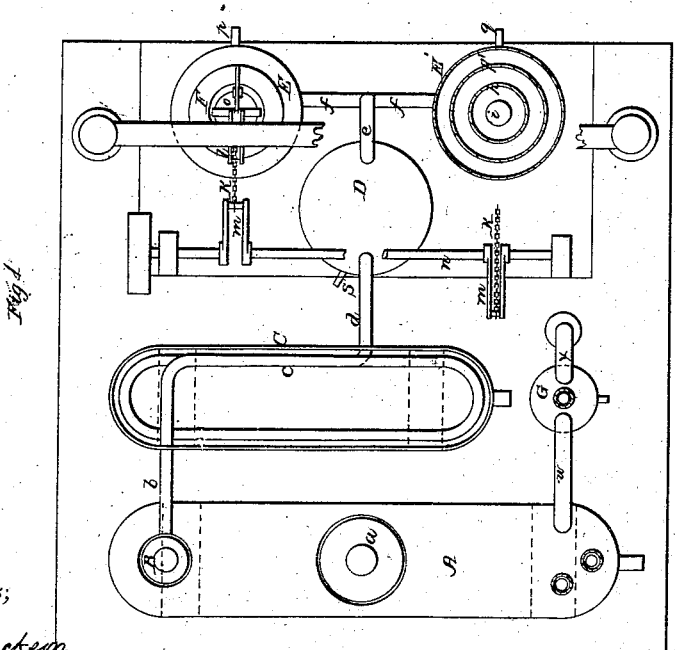

Figure 1 represents a plan or top view of this invention.
Figure 2 is a sectional side elevation of the same.
Similar letters of reference indicate like parts.

This invention relates to an apparatus which is particularly intended to accelerate the evaporation or distillation of liquids or fluids of any description. The fluid to be evaporated or distilled is put in a vessel, which is hermetically closed, and through which air is made to pass either by a suction or by a force-pump, the joint being produced by the liquid itself in such a manner that by the air passing through the heated fluid the evaporation or distillation is materially facilitated. The pump which is used to exhaust the air from or force the air in the boiler, is constructed on the principle of a diving-bell, which is suspended in a vessel partially filled with water, or other liquid, and provided with a central tube, which rises from a false bottom in said vessel, and is provided with a valve on top in such a manner that in raising the diving-bell the valve on the top of the central tube is raised, and the external air is sucked in through a suitable pipe, extending down near to the bottom of the boiler, and in lowering said diving-bell the air or vapors accumulated in the same are discharged through the top valve of the bell. The same device may also be used for the purpose of injecting air in the boiler by direct force instead of by suction. The vapors rising from the liquid in the boiler, and impelled by the current of air, which is produced either by suction or direct force, pass through a suitable condenser, wherein the largest part of the vapors is condensed, while a small percentage of vapor, together with the non-condensible vapor and the air, escapes in the diving-bells, whence it is expelled through the top-valves.

A represents a boiler or retort, which is heated by a direct fire, or in any suitable manner, and which is hermetically closed, access being had to its interior through a man-hole, a, which is closed by a man-hole plate in the ordinary manner. The boiler A is made cylindrical, oval, or in any other suitable form or shape, and it is provided with a dome, B, from which emanates a pipe, b. This pipe connects with a coil, c, situated in a vessel, C, which is filled with cold water, so that the condensible vapors or gases passing through said coil are condensed and pass off in the liquid state through a pipe, d, into a vessel, D. This vessel is partially filled with water or other suitable liquid, and the pipe d extends down near to its bottom, so that the vapors or gases discharging from the same are compelled to rise through the liquid contained in said vessel. The non-condensible gases escape through a pipe, e, which emanates from the top of the vessel D, and which connects, by means of branch pipes f f with the vessels E E'. These vessels are nearly filled with water or other suitable liquid, and they are provided with false bottoms g, which are situated at such a distance from the real bottom that room is obtained for the introduction of the branch pipes f' f'. From the false bottoms of the two vessels E E' rise tubes h, which communicate with the space below said false bottom through holes i, and which are provided with valves g' closing their tops. These valves open upwards. Over the central tubes h are placed the diving-bells F F, which are suspended from chains k running over pulleys l, and connecting with cranks m in a crank-shaft, n, said crank being placed at an angle of one hundred and eighty degrees, so that one of the diving-bells rises while the other sinks down, and *vice versa*. Said diving-bells are provided with valves, o, in their tops, and by imparting to the crank-shaft n a revolving motion, a rising and falling motion is imparted to the diving-bells, and the air is exhausted from the vessel D, coil c, and boiler A. The vessels E E' are provided with overflow pipes p, and with discharge pipes r, the pipes q extending to the spaces above and the pipes r to the spaces below the false bottoms, as shown in fig. 2, and a pipe, s, serves to discharge the liquid from the vessel C. The boiler A is provided with three (more or less) pipes, t, u, v, which extend down in the same to varying depth, say to a distance of six, four, and two inches, respectively, from the bottom of said boiler. Either of these pipes may be connected with a siphon-pipe, w, which passes down through the top of a vessel, G. This vessel is filled with liquid, and from it emanates a curved pipe, x, the mouth of which is closed by a valve, y, opening inward, and the inner end of which extends near to the bottom of the vessel G. When the air in the boiler A is exhausted by the action of the diving-bells, or by other pumps, the external air rushes in through the valve y and vessel G, and a current of air is created through the boiler and the coil in the condenser whereby the evaporation or distillation is materially accelerated. Instead of producing a current of air by suction, a force-pump of any suitable description may be applied to the pipe x and the air may be forced through the liquid in the boiler and through the coil in the condenser. By changing the siphon pipe w from the pipe v to the pipes u or t, the effect of the impelled current of air may be regulated according to the depth or nature of the liquid in the boiler A.

I am aware that air has been driven through the liquid contained in open pans or boilers for the purpose of accelerating the evaporation, but I have never known of a current of air having been driven through a closed boiler connected with a condenser. I am also aware that steam has been injected into retorts to chase the vapors rising from liquid out of the retort; all this I do not claim.

Having thus described my invention, I claim as new, and desire to secure by Letters Patent—

The arrangement of the air-valve y, pipe x, vessel G, pipe n', boiler A, condenser C, reservoir D, and diving-bells F F', constructed and operating substantially as and for the purpose set forth.

<div style="text-align: right">PRE. TPH. BADOUX.</div>

Witnesses:
  W. HAUFF,
  WM. F. McNAMARA.